United States Patent [19]

Ogle et al.

[11] Patent Number: 5,090,772
[45] Date of Patent: Feb. 25, 1992

[54] MOBILE CHAIR AND SEAT FORM

[75] Inventors: Christopher L. Ogle, Malak; Ann L. Land, Nakara, both of Australia

[73] Assignee: The Northern Territory of Australia, Darwin, Australia

[21] Appl. No.: 485,789

[22] Filed: Feb. 23, 1990

Related U.S. Application Data

[60] Continuation of Ser. No. 249,121, Sep. 22, 1988, abandoned, Division of Ser. No. 176,052, Apr. 1, 1988, abandoned.

[51] Int. Cl.$^5$ .............................................. A47C 7/00
[52] U.S. Cl. ............................ 297/440; 297/DIG. 1; 297/118
[58] Field of Search .................. 297/458, 460, DIG. 1, 297/DIG. 2, 114, 284, 440

[56] References Cited

U.S. PATENT DOCUMENTS

| | | | |
|---|---|---|---|
| 3,259,435 | 7/1966 | Jordan, Jr. | 297/458 |
| 3,316,018 | 4/1967 | Stith | 297/118 X |
| 3,773,329 | 11/1973 | Secter | 297/118 X |
| 4,441,221 | 4/1984 | Enste | 297/118 X |
| 4,753,482 | 6/1988 | Warren | 297/458 |

FOREIGN PATENT DOCUMENTS

| | | |
|---|---|---|
| 2828085 | 6/1978 | Fed. Rep. of Germany . |
| 2734460 | 2/1979 | Fed. Rep. of Germany . |
| 151708 | 12/1969 | New Zealand . |
| WO82/01465 | 5/1982 | PCT Int'l Appl. . |
| 725615 | 6/1953 | United Kingdom . |
| 1258752 | 12/1971 | United Kingdom . |
| 2181642 | 4/1987 | United Kingdom . |

Primary Examiner—José V. Chen
Attorney, Agent, or Firm—Pretty, Schroeder, Brueggemann & Clark

[57] ABSTRACT

A mobile chair is disclosed which includes a seat form 60 having an integrally-formed back portion 61 and base portion 62. The lengths of the back and base portions can be extended by the addition of extension segments 19 and 92. An alternative seat form configuration comprises two separate portions 61 and 62 interconnected by a plurality of multileveled hinges 63, to allow the angle between the back portion 61 and the base portion 62 to be varied. The extension segments are secured to the previous extension segment or to the basic portion by two segment bolts 68 which have a threaded shaft 70 and a slotted head 69 with a threaded bore 71. The bolts engage a threaded bore 67 in the base or back portions or the threaded bore 71 of the previous extension segment bolt 68. A pommel 81 is releasably connected to the base portion 62 to improve abduction.

52 Claims, 11 Drawing Sheets

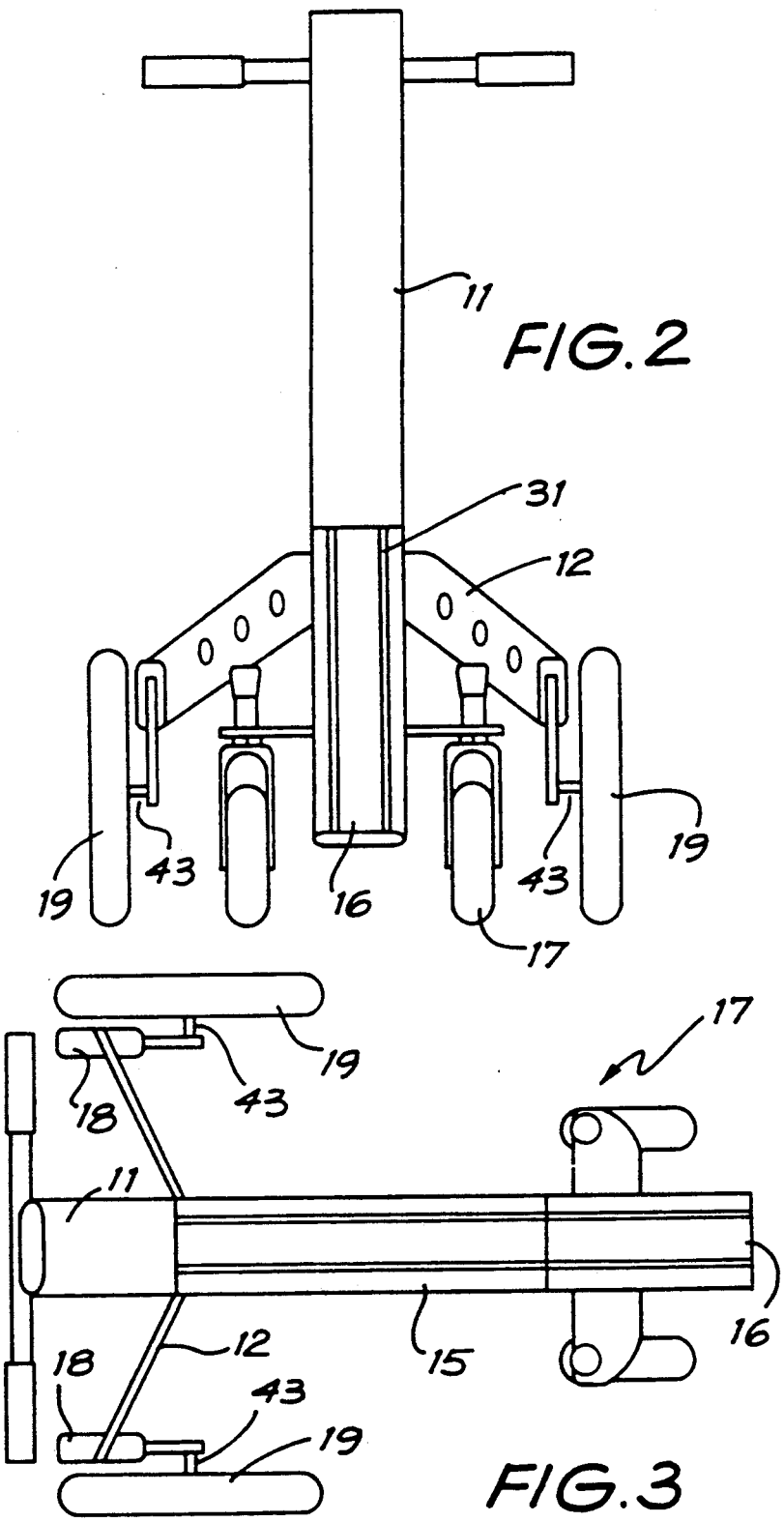

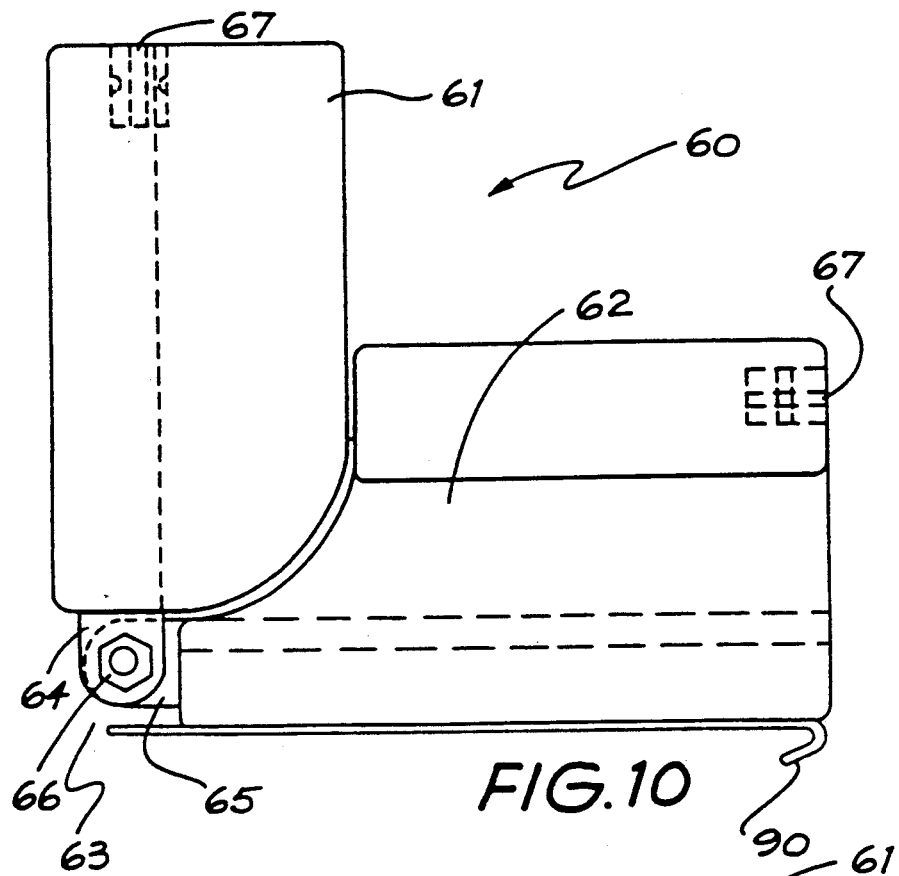
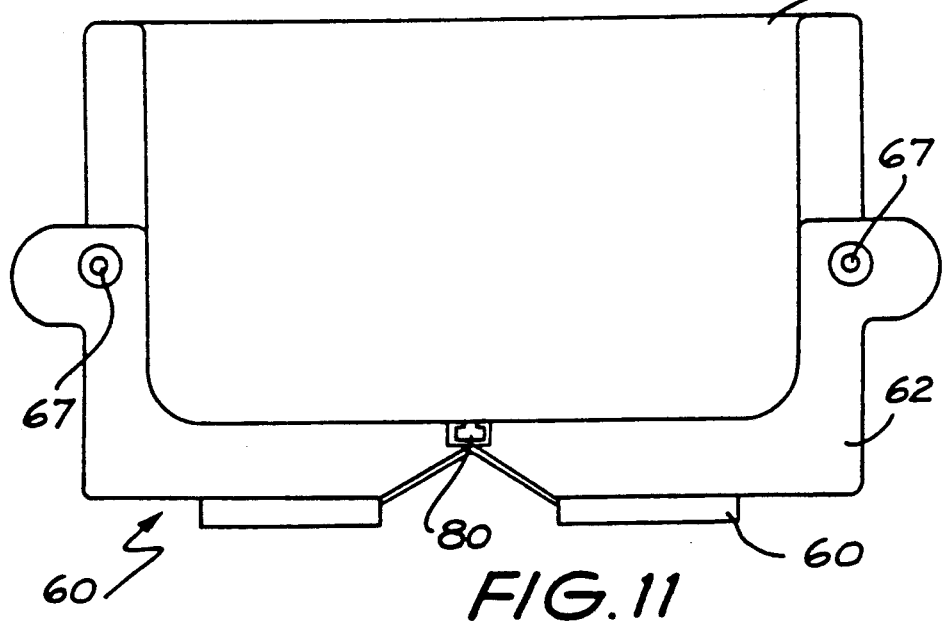

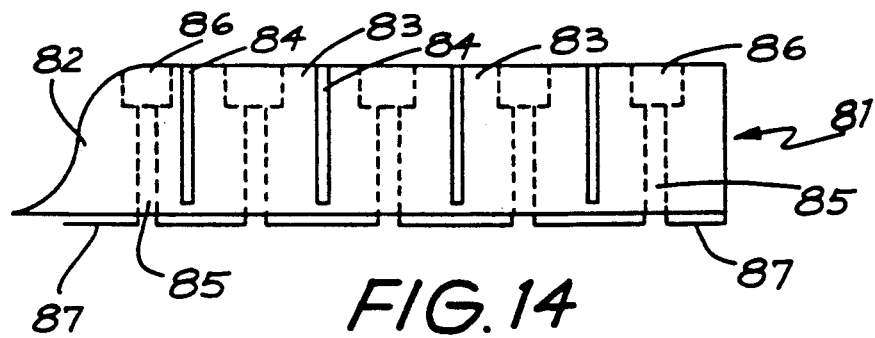
FIG. 14
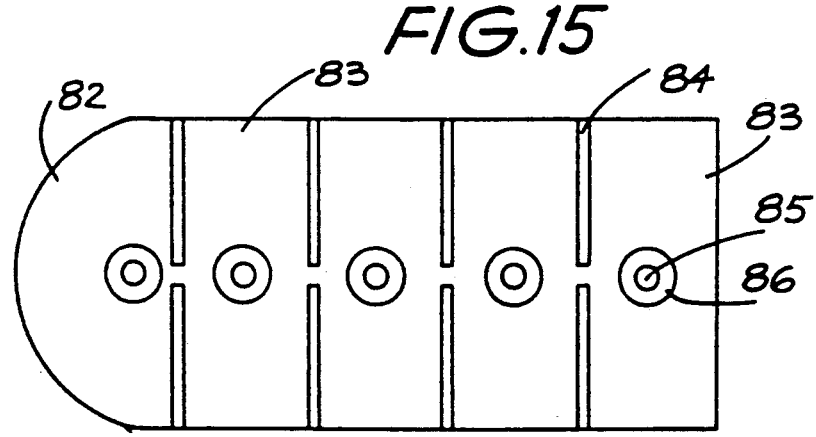
FIG. 15
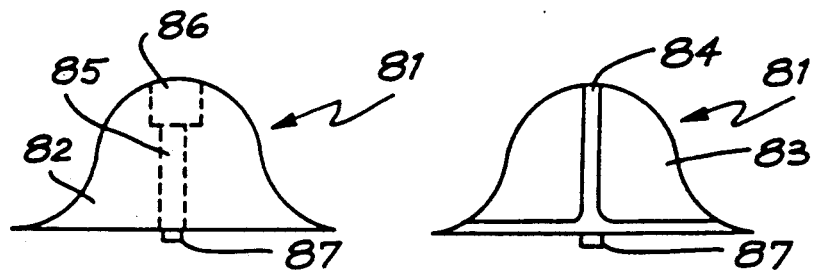
FIG. 16
FIG. 17

MOBILE CHAIR AND SEAT FORM

This application is a continuation of application Ser. No. 249,121, filed Sept. 22, 1988 now abandoned. which is a division of application Ser. No. 176,052, filed Apr. 1, 1988 now abandoned.

FIELD OF THE INVENTION

This invention relates to mobile chairs such as pushchairs and wheelchairs. Pushchairs traditionally have small rear wheels and are designed to be maneuvered by a person standing behind the chair, the chair is not designed to be maneuvered by a person sitting in the chair except where motorised. Wheelchairs traditionally have large rear wheels which are arranged to be rotated by a person sitting in the chair. Wheelchairs are designed to be maneuvered by either the person sitting in the chair or by someone standing behind the chair.

This invention also relates to seats and in particular to the internal structure of a seat to which padding is applied and from which the seat gets its shape, known as a seat form.

BACKGROUND OF THE INVENTION

Mobile chairs are usually difficult to maneuver because of their size and weight, additionally, the design of mobile chairs do not allow the feet of the person pushing the chair to be placed under the chair, thus requiring the person to push the chair with extended arms or to take small steps, either of which is uncomfortable to the pusher. The weight of the mobile chair affects its inertia and the force required to maneuver the chair. Thus, the lighter the chair the easier it is to maneuver and to start and stop. The frames of prior art mobile chairs are rigid and do not allow the seat fitted thereto to be individually tailored to suit the user. There is no provision for readily reclining seat of the chair or for changing the orientation of the seat with respect to the horizontal.

In the past, seats have been made from forms of a standard size and therefore each seat developed with that particular form has one standard size. If a seat is required to be shortened or lengthened a separate form has to be developed and manufactured from which to make the seat. This seat form has particular application to the seats for mobile chairs so that the mobile chairs may be tailored to suit the individual requirements of the user.

SUMMARY OF THE INVENTION

Accordingly, the present invention includes a frame for a mobile chair comprising a substantially narrow backbone member arranged to support handle grips for manouvering the chair at an upper portion thereof and having mounts for securing rear wheels to a bifurcated lower portion thereof;

a seat support member extending from the backbone member intermediate the upper and lower portions for supporting a seat thereon; and a front member extending downwardly from the seat support member to support the distal end thereof, the front member being connected at its lower end to at least one front wheel.

Preferably, the backbone member is articulated so that the angle between the upper portion and the seat support member may be varied.

Preferably, the articulated joint comprises a double hinge arrangement interconnecting the upper and lower portions and forming part of the lower portion; wherein the upper portion of the backbone member is connected to a first hinge and a clamp member is connected to a second hinge offset from the first hinge whereby the relative angle between the upper and lower portions is maintained by securing the clamp member to the upper portion.

Preferably, the seat support member is releasably connected to the lower portion of the backbone member in the region of the double hinge arrangement.

Preferably, the rear wheel mounts are adjustable to vary the effective height of the lower portion of the backbone member.

Preferably, the rear wheel mounts effect the height variation by rotation of the axles of the rear wheels about an offset axis.

Preferably, the height variation causes approximately a 12° variation in the angle of the seat support member with respect to the horizontal.

Preferably, the upper portion of the backbone member, the seat support member and the front member are formed from similar aluminium extrusions each having at least one slot arranged to receive the heads of bolts for securing the clamp member, the handle grips, footrests and seat mounting means respectively to the frame.

The second aspect of the present invention provides a seat form which may be extended in either the back portion or the base portion or both, so that seats of different sizes may be readily made using a standard form with standard extension segments. This type of seat has particular application in hospitals where seats of varying sizes may be required, e.g., on pushchairs for severely physically handicapped people or for wheelchairs so that the persons of different physical sizes may be readily accommodated. The use of such a seat form may have applications in a vast array of situations, including such circumstances as car seats for children and in other areas in which of varying sizes may be required, the form may be created so that the seat portion and back portion of the seat form are integrally formed so that the relative angle between the seat portion and back portion is fixed at a predetermined angle or the seat form may be constructed so that the relative angle may be adjusted to suit the user's requirements.

Accordingly, the present invention provides a seat form comprising formed with a back portion and a base portion, one or more extension segments secured thereto to extend the length of either or both the back and base portions.

Preferably, the seat form has raised sides extending along the base portion and base extension segments.

Preferably, the base portion has a forward facing surface and base extension segments have parallel front and rear surfaces similar to the forward facing surface wherein a first base extension segment may be secured to the base portion such that the forward facing surface abuts the rear surface of the first base extension segment, and additional base extension segments abutt the preceding segment, rear surface to front surface whereby the length of the base portion is extended without changing the profile of the front surface of the base portion of the seat form.

Preferably, the back portion has an upward facing surface and the base extension segments have parallel upper and lower surfaces similar to the upward facing surface, wherein a first back extension segment may be secured to the back portion such that the upward facing surface abutts the lower surface of the first back extension segment and additional back extension segments abutt the preceding segment, lower surface to upper surface, whereby the length of the back portion of the seat form is extended without changing the profile of the upper surface of the seat form.

Preferably, the back portion and the base portion are secured to one another in a manner allowing the relative angle formed between the back and base portions to be varied.

Preferably, a pommel is provided on the base portion.

Preferably, the location of the pommel on the base portion is variable.

Preferably, the pommel is formed in segments and is adjustable in length to suit the base portion by removing or adding segments as required.

Preferably, the seat form is adapted for use with a push chair or the like and has a base plate moulded or otherwise secured to the base portion to facilitate mounting of the seat form to the frame of the push chair, etc.

Preferably, the base plate allows interchange of the seat form between a push chair or the like and a vehicle.

BRIEF DESCRIPTION OF THE DRAWINGS

Notwithstanding any other forms that may fall within its scope, preferred forms of the invention will now be described, by way of example only, with reference to the accompanying drawings in which:

FIG. 2 is a front view of the chair frame of FIG. 1;

FIG. 3 is a view from above of the chair frame of FIG. 1;

FIG. 10 is a side elevational view of another embodiment of a seat form in accordance with the present invention showing how the back and base portions are connected;

FIG. 11 is an end elevational view of the seat form of FIG. 10;

FIG. 14 is a side elevational view of a pommel in accordance with present invention;

FIG. 15 is a view from above of the pommel of FIG. 14;

FIG. 16 is an end elevational view of the pommel of FIG. 14;

FIG. 17 is an end elevational view of a section through the pommel of FIG. 14;

DETAILED DESCRIPTION OF THE PREFERRED EMBODIMENT OF THE INVENTION

Figure 1:
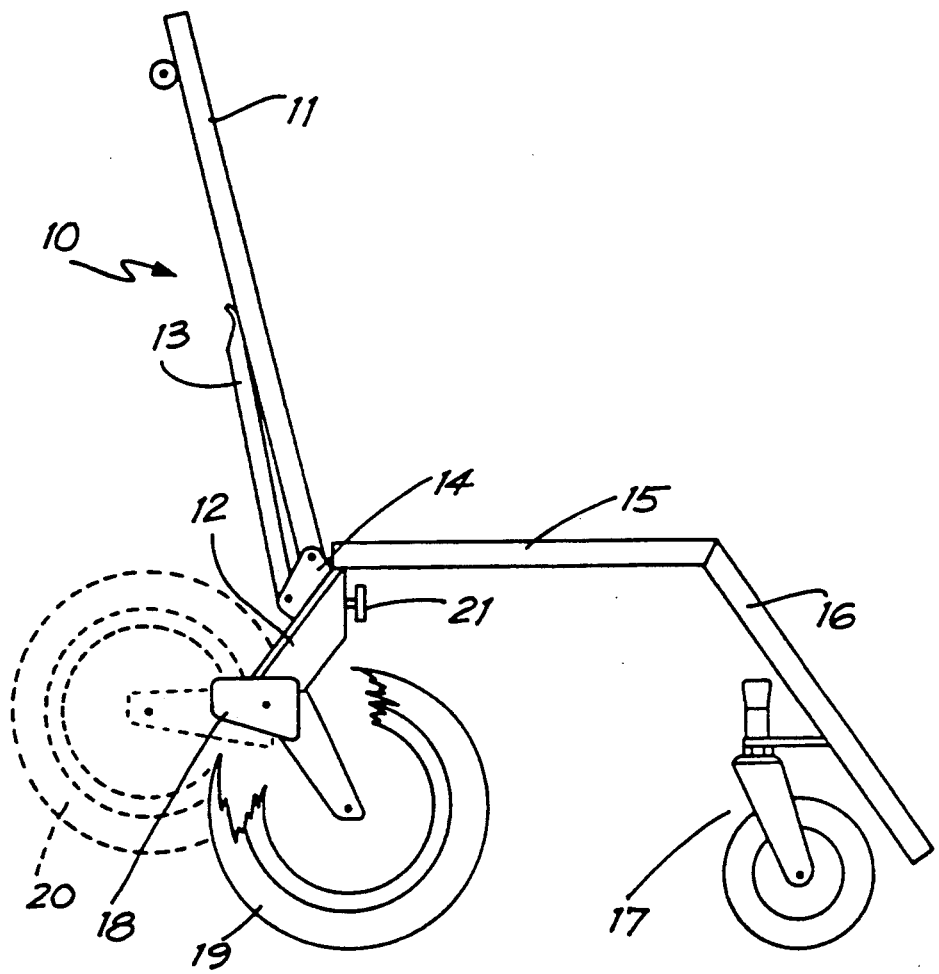
FIG. 1 is a side view of a mobile chair frame incorporating a hinge arrangement and rear wheel mounts according to the preferred embodiment.

As can be seen from FIGS. 1, 2 and 3, the mobile chair frame comprises a narrow backbone member 10 having an upper portion 11 and a bifurcated lower portion 12. A clamp member or lever 13 is shown connected to the upper portion at one end and its other end being connected to an articulated hinge arrangement 14 which forms part of the lower portion of the backbone frame. Extending from the hinge arrangement 14 is a seat support member 15. The distal end of the seat support member is supported by a front member 16 which is connected to a front wheel arrangement 17. The front wheel arrangement may incorporate a single wheel or two wheels as shown. The front wheel arrangement is castered allowing the mobile chair to be steered.

The lower portion 12 of the backbone member is bifurcated to form a fork and in the preferred embodiment the backbone member is in the form of an inverted Y. The lower ends of the inverted Y are fitted with rear wheel mounts 18 to which rear wheels 19 are fitted. The rear wheel mounts 18 may be rotated so that the rear wheels are relocated to a new position 20 as shown in ghost form in FIG. 1.

The seat support member 15 is releasably connected to the backbone member 10 by a tongue and slot arrangement wherein a tongue (not shown) forms part of the seat support member and is arranged to fit within a groove or slot in the lower portion of the backbone member. The tongue is secured in the slot by means of a hand screw 21.

Figure 4:
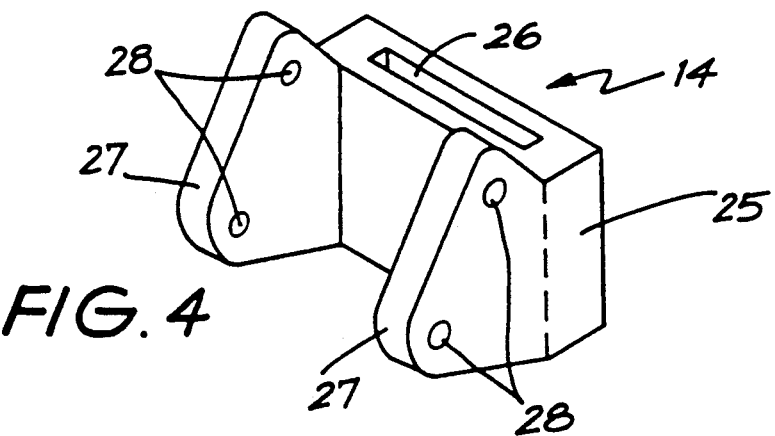
FIG. 4 is an enlarged view of the hinge arrangement of the preferred embodiment.
Figure 5:
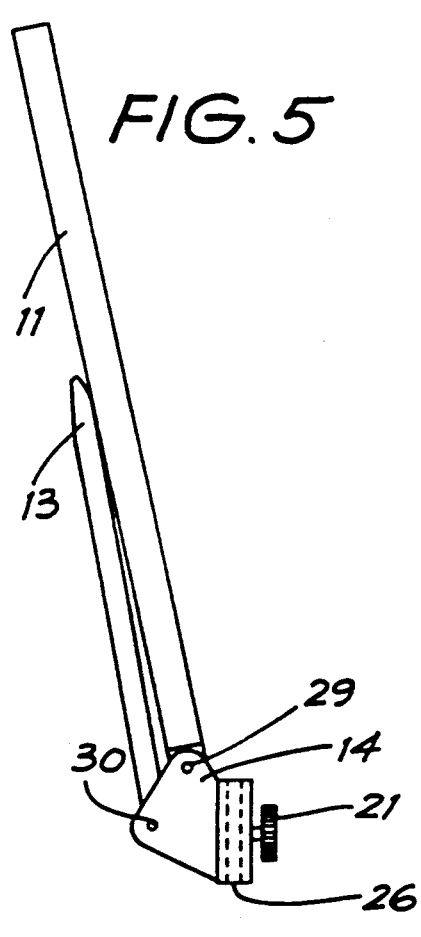
FIG. 5 and FIG. 6 illustrate how the hinge is connected to the frame.
Figure 6:
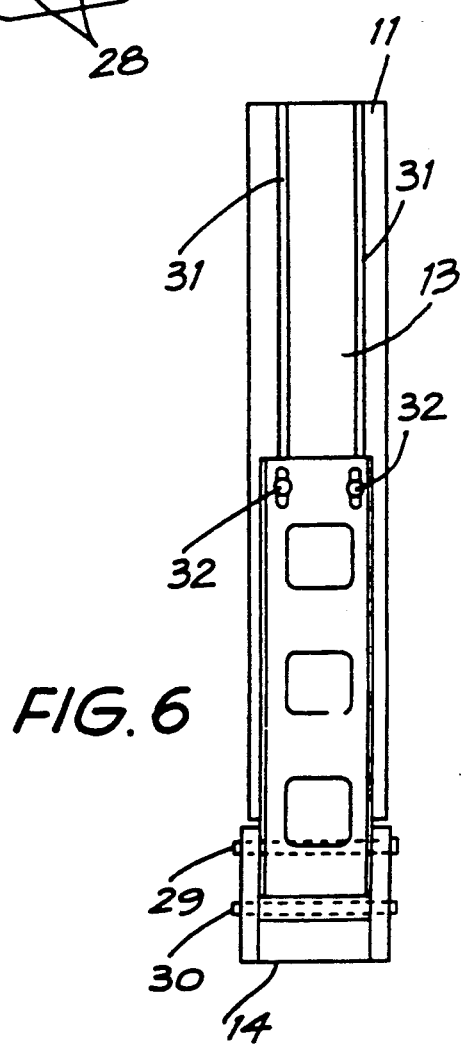

The hinge 14, is depicted more clearly in FIG. 4. As can be seen in that Figure, the hinge comprises a main body 25 which has a slot 26 passing therethrough. The slot 26 is arranged to receive the tongue from the seat support member. The top surface of the hinge body is arranged to abutt the seat support member 15. The hinge has two side arms 27 through which two sets of holes 28 are provided to support two axles 29 and 30. Axle 29 connects the upper portion to the hinge and axle 30 connects a clamp member 13 to the hinge. By this arrangement both the clamp member and the upper portion are freely pivotable about their respective axles. However, as the axles are offset when the clamp member 13 is fastened or secured to the upper portion a triangular body or truss is formed preventing rotation of either the upper portion 11 or clamp member 13 about their respective axle. The preferred embodiment utilizes an aluminium extrusion containing two extruded slots 31 extending along one surface, each slot 31 being arranged to receive the head of a bolt. The clamp member 13 is secured to the upper portion 11 by means of two bolts 32 placed in respective slots and passing through respective holes in the clamp member, nuts are then placed on the bolts to securely fasten the two members together. To allow the upper portion to pivot, thus varying the angle between the upper portion and the lower portion, the two bolts 32 are loosened allowing the clamp member to slide along the undersurface of the upper portion at the same time the bolts 32 will slide within their respective slots 31.

As the hinge 14 is securely attached to the lower portion and the seat support member 15 is securely attached to the hinge 14, the change in relative angle between the upper portion and lower portion also changes the relative angle between the upper portion 11 and the seat support member 15, therefore allowing a seat to be used on the mobile chair which has a back portion which is able to be moved with respect to the seat portion or indeed a seat which has a back portion and a seat portion formed as two separate items and mounted directly to the appropriate parts of the frame of the mobile chair.

The seat support member 15 and the front member 16, are made of the same aluminium extrusion as the upper portion 11, the extruded slots providing means for securing the seat to the frame. A footrest may be similarly secured to the front member and because of the slot arrangement, its height may be readily adjusted. Handle grips for maneuvering the chair are similarly fastened to the upper portion of the upper portion of the backbone member. Although the preferred embodiment uses twin slots, any other number of slots may be used including a single slot in the aluminium extrusion without departing from the spirit of the invention. Similarly, although two front wheels are shown, the front wheel arrangement may comprise a single wheel, the front wheel or wheels as the case may be, are, of course, pivotally attached to the front member so that the mobile chair may be steered.

Figure 7:
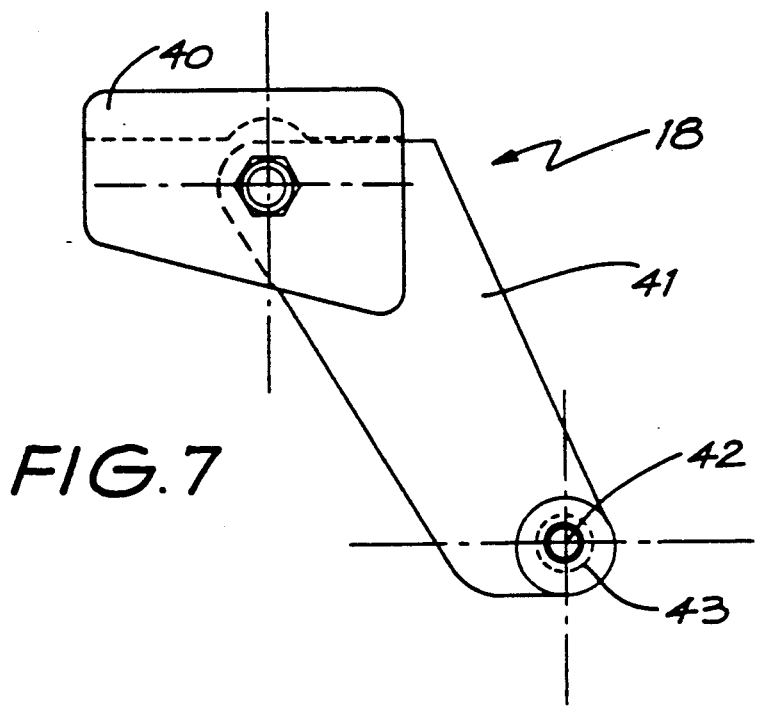
FIG. 7 illustrates a rear wheel mount in accordance with the embodiment shown in FIG. 1.

The rear wheels are attached to respective ends of the forked lower portion of the backbone member by respective wheel mounts 18. Each wheel mount, as more clearly shown in FIG. 7, comprises main body 40 which is of substantially U-shaped cross section. Pivotally attached to the main body 40 and passing between its legs is an arm 41 which has a hole 42 through which the axle 43 of the wheel 19 is mounted. The arm 41 is pivotally connected to the mount body 40 at one end and arranged so that it may pivot between two positions such that in the first position the wheel axle 43 is in front of the pivotal axis and in the second position the wheel axle 43 is to the rear of the pivotal axis so that downward pressure on the wheel mount causes the arm 41 to bear against the mount body 40, thereby preventing downward forces from rotating the arm 41.

Thus, it can be seen that regardless of the downward force exerted on the mobile chair, the rear wheels will not change from one orientation to the other. To change orientation it is necessary to lift the mobile chair so that no force is applied to the rear wheel about to be changed so that it can be rotated from one position to the other. This may be accomplished by either physically picking both wheels of the chair off the ground or simply by tipping the chair to one side so that one wheel becomes airborne which it may then be rotated to the other position placing that wheel back on the ground and tipping the chair in the other direction allows the other wheel to be similarly orientated. By such an arrangement, locking pins are not necessary, however, should the forward orientation not be sufficiently forward of the pivot axis, it may be desirable to incorporate a locking pin to prevent accidental change of orientation. Similarly, a locking pin with appropriate holes passing through the mount body or arm can be provided to allow additional orientations of the rear wheels to be maintained.

The change in the location of the rear wheels allows the relative angle between the seats support member and the horizontal to be varied. By changing the rear wheel location the effective height of the lower portion 12 of the backbone member 10 is varied. As the height of the front member is kept constant the relative angle of the seat support member to the horizontal is varied. A similar result could be achieved by varying the height of the front member while maintaining the height of the lower portion constant. The arm 41 may also be used to mount a braking system for the rear wheels of the mobile chair.

Figure 8:
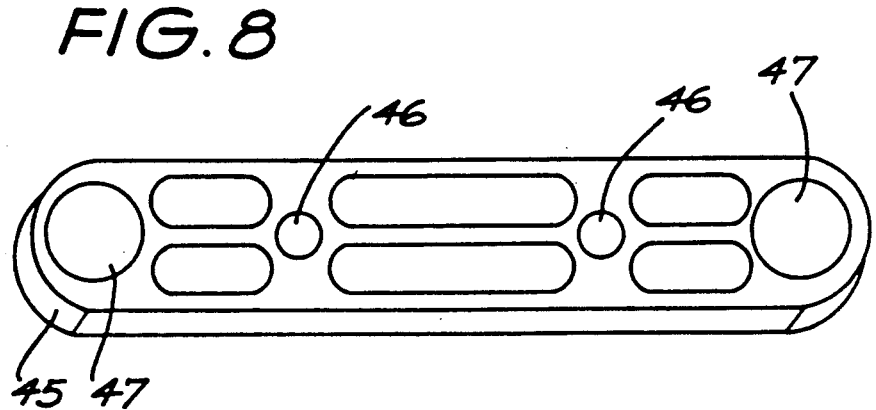
FIG. 8 illustrates a mounting block used to connect the seat and footrests to the frame.

Mounting blocks 45 as illustrated in FIG. 8 are connected to the slots 31 of the seat support member 15 by bolts. The mounting blocks 45 have holes 46 through which the bolts pass. Other holes 47 are provided in which the mounts for the seat are clamped by means of grub screws or set screws (not shown). Alternatively, the seat mounting frame may be bolted directly to the slots 31 of the seat support member 15.

The slots 31 of the front member 16 similarly receive the bolts for the mounting blocks 45 used to mount the footrests, the use of the slots 31 allow the height of the footrests to be varied to suit the user. The use of the mounting blocks allows the footrests to be positioned spaced from the front member 16 again to suit the individual requirements of the user.

The mounting blocks 45, upper portion 11, seat support member 15 and the front member 16, may be hollow alluminum alloy extrusions to reduce the weight of the frame while maintaining its strength. At the same time, providing a cost efficient method of manufacturing the frame.

It should be realized that the mobile chair frame described may be used with either large wheels in a wheelchair configuration or small wheels as in a pushchair configuration. The difference between the two configurations requiring only a change in the length of the lower portion 12 of the backbone member.

The frame of the mobile chair may be utilized with any type of seat suitable, however a particular advantageous seat may be formed using a seat form developed by the same inventors in which the seat form can be extended to produce a seat to suit the user's individual needs and requirements. Such a seat form will now be described with reference to FIGS. 9 to 23 of the accompanying drawings.

Figure 9:
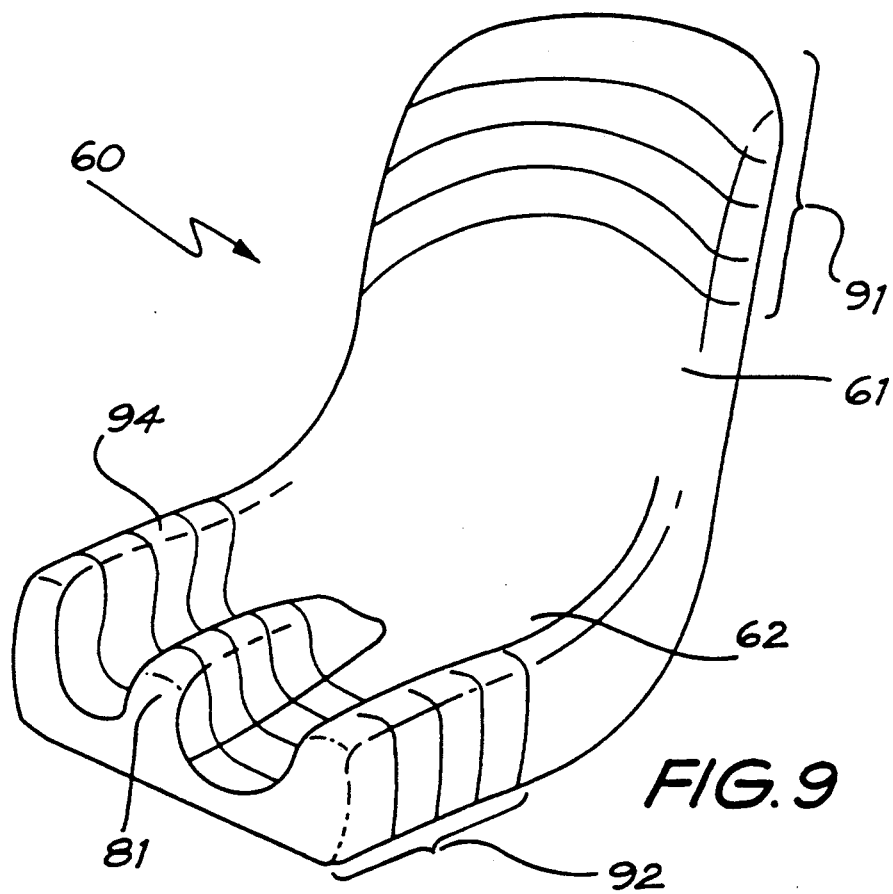
FIG. 9 illustrates one embodiment of a seat form in accordance with the present invention.

The seat form illustrated in FIG. 9 has a back portion and a base portion which are formed integrally and thus have a fixed relative angle formed therebetween. The seat form 60 has a back portion 61 and a base portion 62. Connected to the back portion is a series of back extension segments 91 extending the height of the back portion. Connected to the base portion 62 is a series of base extension segments 92 extending the length of the base portion of the seat form. The base portion is illustrated as having raised sides 94 to support the legs of the user. The raised sides are extended by the extension segments 92. A pommel 81 is formed in the base portion of the seat form and is also extended by the extention segments. The pommel is provided for improving abduction of the user.

Figure 12:
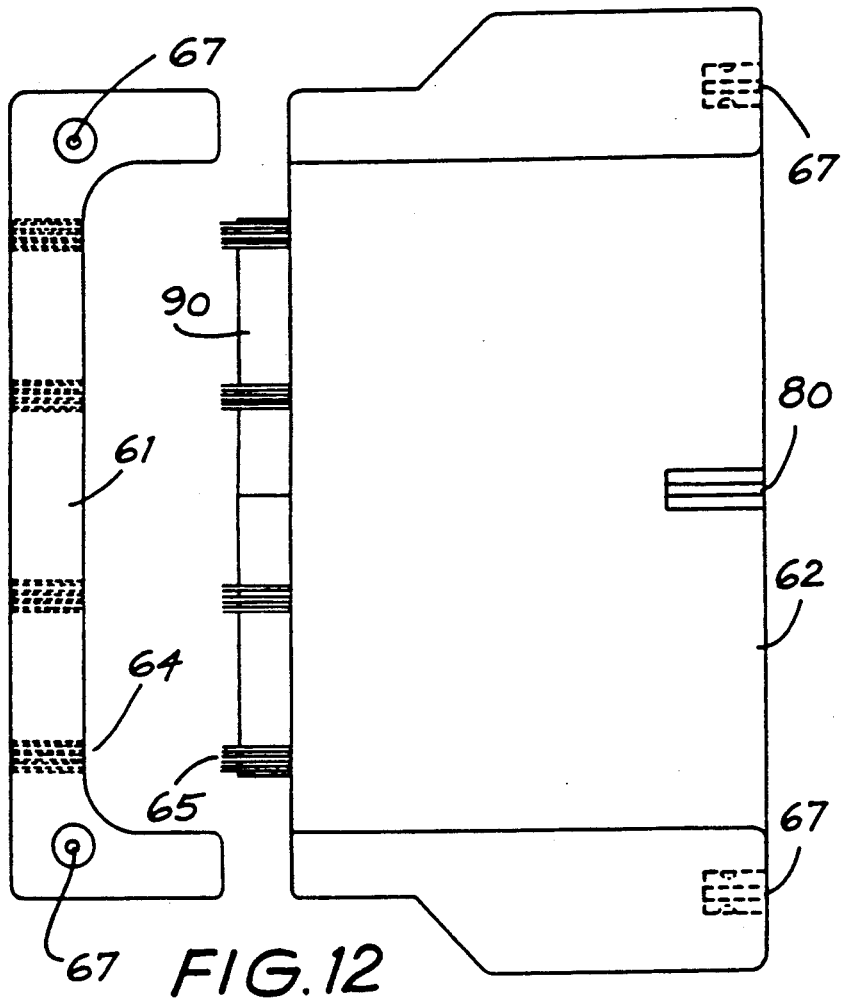
FIG. 12 is a view from above of the seat form of FIG. 10 with the back and base portions separated for clarity.

In certain situations it is advantageous to provide a seat form in which the angle formed between the back portion and the seat portion may be varied. Such a seat form forms the basis for the preferred embodiment of this invention and is illustrated in FIGS. 10, 11 and 12. As illustrated in these Figures, the seat form 60 of the preferred embodiment has two basic portions, a back portion 61 and a base portion 62.

Four friction hinges 63 are used to secure the two portions together. Each frictional hinge comprises four tongues 64 extending from the back portion and interleaved with three tongues 65 extending from the base portion, the tongues being clamped together by a bolt 66. The relative angle between the two portions may be readily adjusted when the bolts 66 are slackened and once the desired angle has been formed for maximum personal comfort and support for the individual user, the bolts 66 are tightened to rigidly secure the two portions at the desired relative angle. Thus it can be seen that although the portions are rigidly held in a fixed relative orientation with each other, the angle can be adjusted to suit individual requirements. It is not envisaged that the seat would be used in a situation where the angle would be adjusted frequently, rather only occasionally, e.g. when the seat is used in conjunction with a wheelchair or the like and the wheelchair is to be used by another person. It is envisaged that the angle of the seat would be adjusted when the seat is being tailored to suit its owner/user, i.e. when the length of the back and/or base portions are being changed or selected. Of course, other infrequent adjustments may be made and the ability to make such adjustments is accommodated.

Figure 13:
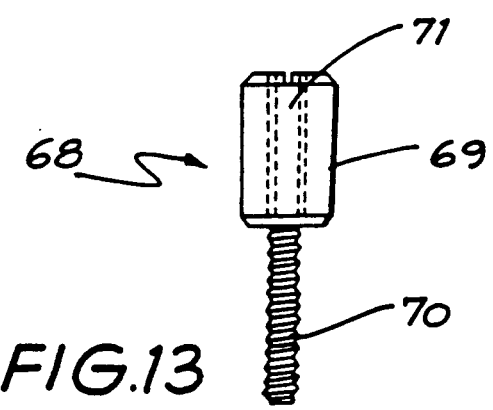
FIG. 13 depicts a segment bolt used to connect segments to the back and base portions of the seat form.
Figure 18:
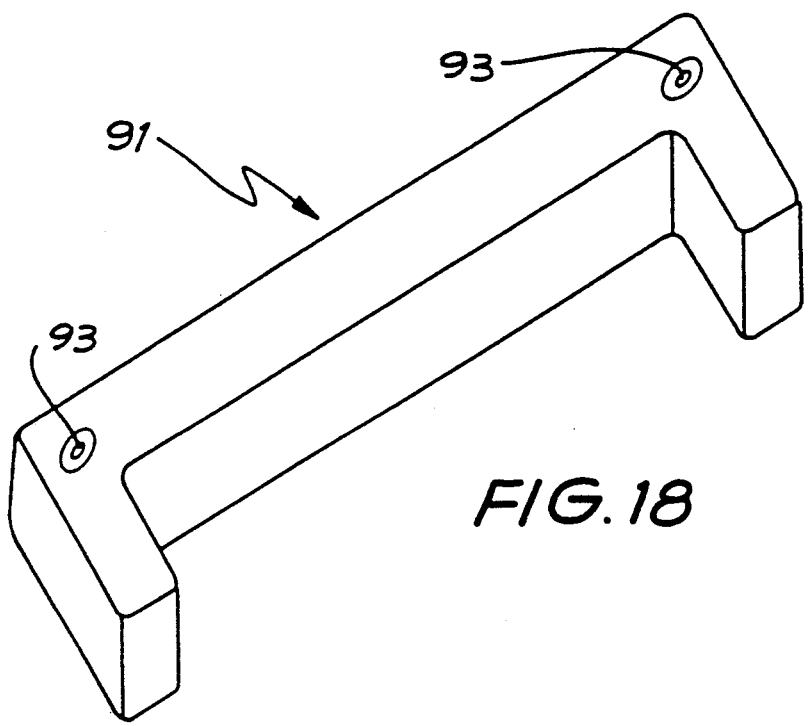
FIG. 18 depicts a segment used to extend the length (height) of the back portion.
Figure 19:
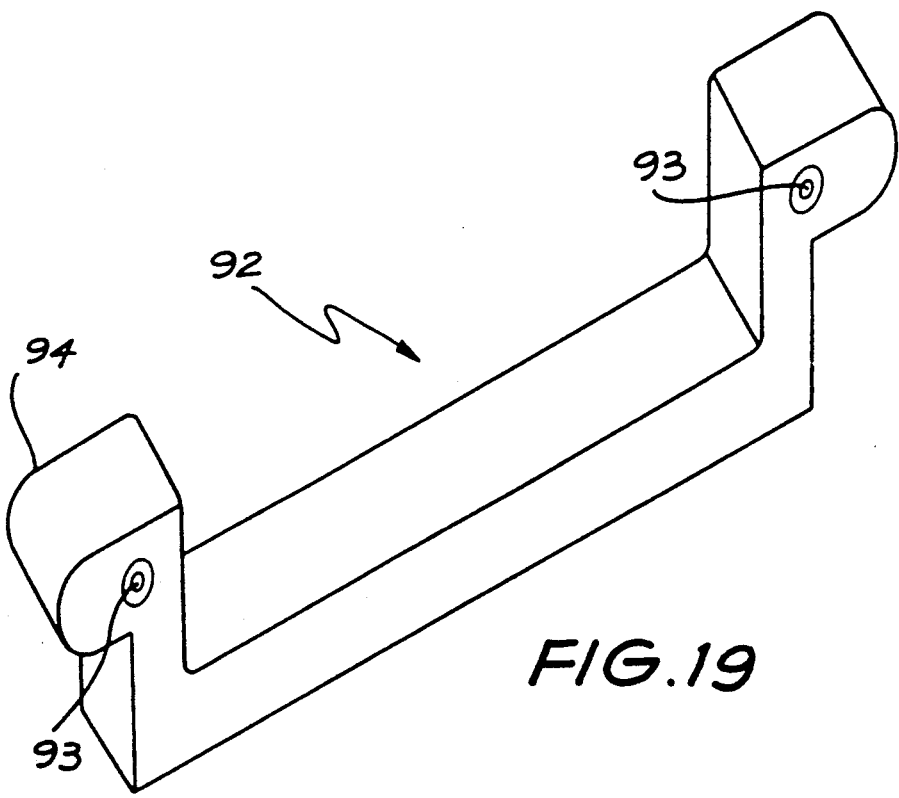
FIG. 19 depicts a segment used to extend the length of the base portion.
Figure 20:
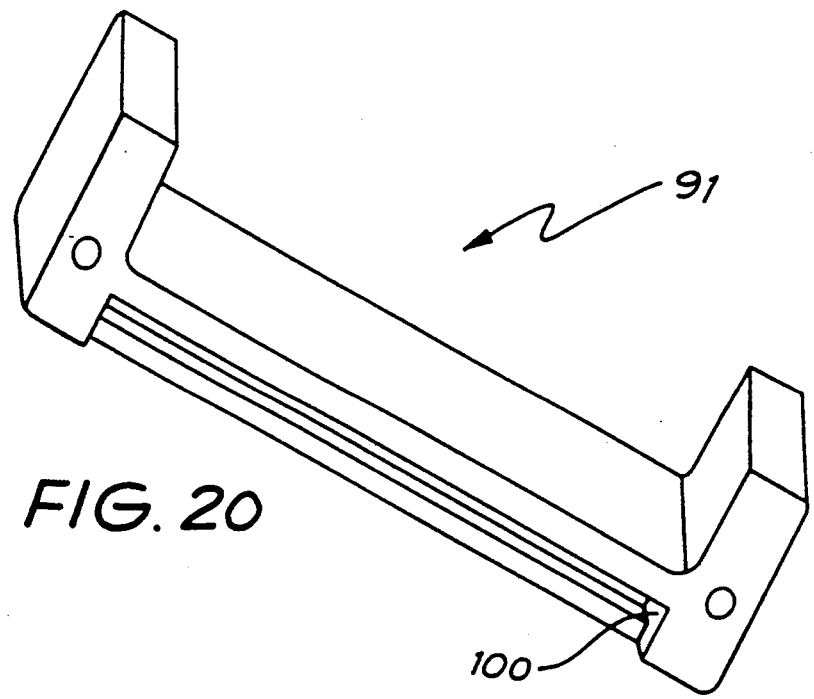
FIG. 20 depicts a back extension segment incorporating a recess for mounting a head rest and/or restraint means.

Both the back portion and the base portion are provided with threaded sockets 67 moulded into or otherwise attached to the portions for securing extension segments 91, 92 as shown in FIGS. 18 and 19 to the portions by means of segment bolts 68. The segment bolt as shown in FIG. 13 has a head 69 and a threaded shaft 70. The top of the head is slotted to receive a screw-driver and the head has a threaded bore extending axially therein to receive the threaded portion of another segment bolt. In this manner, while the first extension segment is secured to the portion, additional segments are secured to the preceding segment by segment bolts screwed into the segment bolts of the preceding segment. Each extension segment 91, 92 is provided with holes 93 therethrough to accommodate the segment bolts. Each hole 93 is provided with an enlarged opening portion to accommodate the head of the segment bolt so that the segment bolts do not protrude from the completed seat form.

The base portion is provided with a C-shaped channel 80 extending axially along and flush with the seating surface of the base portion 62. The channel is open to the seating surface and extends from the outer edge of the base portion a short distance towards the back portion. This channel 80 is arranged to accommodate the head of a Tee-bolt used to secure the pommel 81. The pommel of the preferred embodiment is segmented with a curved leading segment 82 and a number of additional segments 83. The segments are connected by joining webs 84. The required length of the pommel 81 is achieved by cutting the appropriate web 84.

Each segment has a hole 85 passing therethrough to accommodate the shank of the Tee-bolt. The upper opening of the hole has an enlarged portion 86 to receive the nut which is threaded onto the Tee-bolt to fasten the pommel to the base portion. As the channel 80 is continuous the location of the pommel may be varied by sliding the head of the Tee-bolt along the channel until the pommel is in the desired location. A guide 87 may be provided to assist in locating the pommel in the opening of the channel 80.

A mounting plate 90 may be provided as a convenient method of mounting the seat form to the required framework. The framework may, for example, be the frame of a wheelchair, push chair or the like, a swivel base and legs for a standard chair or a special arrangement for mounting the seat in a vehicle. The mounting plate may be molded or otherwise secured to the base portion of the seat form. In the particular case when the user is physically impaired the mounting plate allows the seat to be easily exchanged or relocated from a push chair, for example, to a vehicle so that the user is at all times able to gain the benefit of using a customized seat catering for his particular requirements.

The seat form may provide means for attaching a head rest and/or means for attaching a restraint means. The restraint means is normally in the form of a seat belt arrangement in which webbing is pasted over certain parts of the body to hold the user in the chair. In the embodiment shown in FIGS. 20 to 23, the extension segments used to extend the back portion of the seat form have a stepped recess 100 in the form of a recess within a recess as is more clearly illustrated in FIG. 23. The mounts 101 and 102 for the restraint means and the head rest respectfully, have a similar step or enlarged portion 103 at one end shaped to be located within the recess 100.

Figure 21:
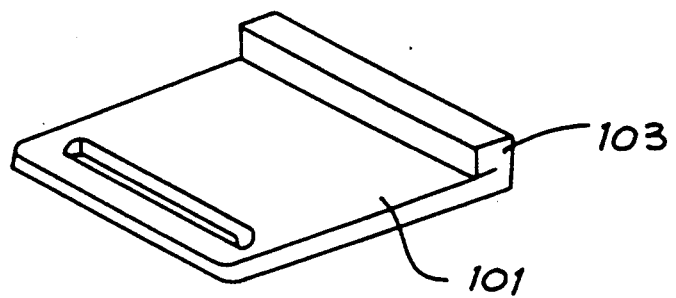
FIG. 21 depicts a restraint mount for use with the extension segment of FIG. 20.

The restraint mount 101 shown in FIG. 21, is formed from a sheet of metal with one end folded over to form the enlarged portion 103. The other end has a slot formed therein to accommodate webbing (not shown) used as the restraint in the usual manner.

Figure 22:
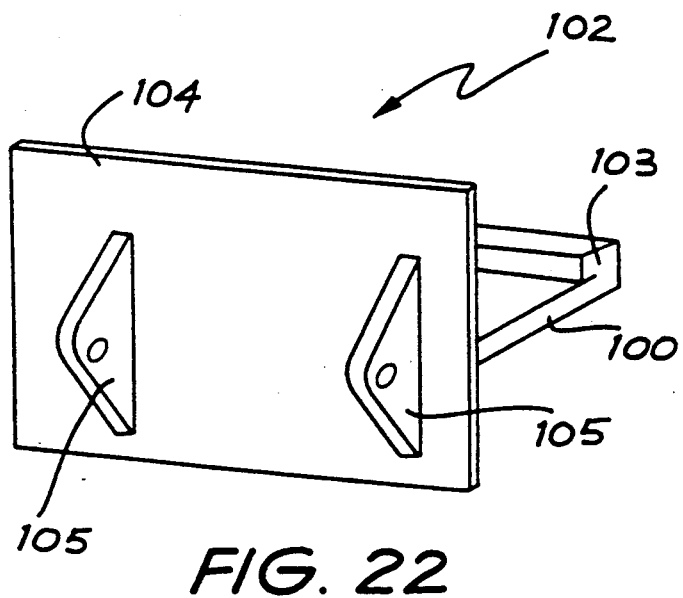
FIG. 22 depicts a head rest mount for use with the extension segment of FIG. 20.

The head rest mount 102 shown in FIG. 22, comprises a plate 104 to which is welded two triangular plates 105, each with a hole therethrough and each extending perpendicular to the plate at respective ends thereof, as illustrated. The plates 105 are arranged to be bolted to a head rest (not shown) which extends above the back portion of the seat form to support the head of the user. Attached (welded) to the rear of the plate 104 is a tongue 106 which is similar to the restraint mount 101 but without the slot. The stepped portion 103 of the tongue 106 is arranged to be fitted into the recess 100 and extend away from the seat form so that the plate 104 extends along the outer surface of the back portion so that the plate is secured against the back of the back portion of the seat form by the tongue 106 being held captive in the recess 100.

Figure 23:
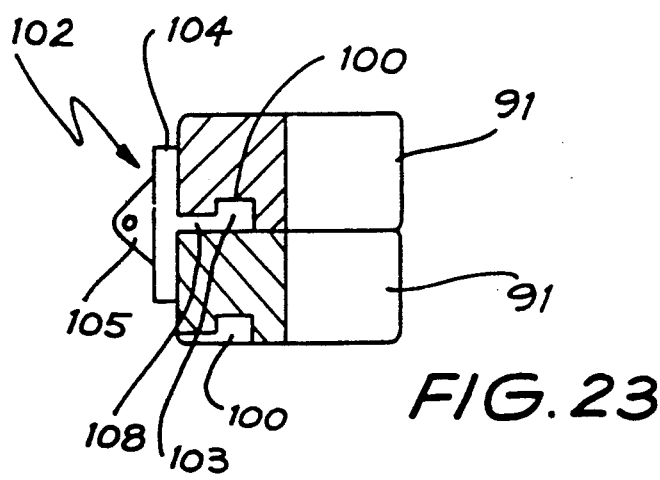
FIG. 23 illustrates how the mounts are secured to an extension segment as shown in FIG. 20.

FIG. 23 illustrates how the tongue 106 is secured within the recess 100, with the back portion extension segments 91 being shown in sectional view. The restraint mount is similarly held captive. The mounts are placed so that the enlarged portions 103 nest within the deeper portion of the recess 100 and the extension segment 91 is secured to the back portion or an adjacent extension segment by segment bolts as depicted in FIG. 23. The position of the mounts may be adjusted by sliding the mounts along the recess 100. Normally two restraint mounts and one head rest mount would be located within the recess of the last extension segment fitted, however, any combination may be used and the recess of any segment may be used. Once the required location along the recess has been achieved the amounts are firmly held in that position by tightening the segment bolts, thus causing the mounts to be clamped in position between the extension segments.

We claim:

1. A seat form comprising:
    a generally vertically-oriented back portion having a width and a height,
    a generally horizontally-oriented base portion secured to the back portion and having a width and a depth, and
    one or more extension segments, each of such extension segments including securing means for rigidly securing it directly to, and abutting, the back portion or the base portion, or another extension segment previously secured to the back portion or the base portion, such that relative movement of the segment and the segment or portion to which it is secured is inhibited, the securing means of each extension segment functioning independently of the securing means of any succeeding extension segment, to vertically extend the height of the back portion, in a direction away from the base portion, or horizontally extend the depth of the base portion, in a direction away from the back portion.

2. A seat form as defined in claim 1, wherein the seat form further includes raised sides extending along the opposite side edges of the base portion and any base extension segments.

3. A seat form as defined in claim 2, wherein the base portion has a forward facing surface, wherein a first base extension segment having parallel front and rear surfaces similar to the forward facing surface of the base portion is secured to the base portion such that the forward facing surface of the base portion abuts the similar rear surface of the first base extension segment, and wherein one or more additional base extension segments each include means for securing such additional base extension segment to the preceding segment such that the rear surface of the additional base extension segment is secured to the front surface of the preceding segment, whereby the length of the base portion is extended without changing the profile of the front surface of the base portion of the seat form.

4. A seat form as defined in claim 3, wherein the back portion has an upward facing surface, wherein a first back extension segment having parallel upper and lower surfaces similar to the upward facing surface of the back portion is secured to the back portion such that the upward facing surface of the back portion abuts the lower surface of the first back extension segment, and wherein one or more additional back extension segments each include means for securing such additional back extension segment to the preceding back extension segment such that the lower surface of the additional back extension segment is secured to the upper surface of the preceding back extension segment, whereby the length of the back portion of the seat form is extended without changing the profile of the upper surface of the seat form.

5. A seat form as defined in claim 1, and further including a pommel secured to, and extending axially along, the base portion.

6. A seat form as defined in claim 1, wherein the seat form has a mounting plate molded or otherwise secured into the base portion to allow the seat form to be interchangeably mounted to various frameworks.

7. A seat form as defined in claim 6, wherein the mounting plate allows the seat form to be interchanged between the framework of a pushchair or the like and a vehicle.

8. A seat form as defined in claim 1, wherein the base portion has a forward facing surface, wherein a first base extension segment having parallel front and rear surfaces similar to the forward facing surface of the base portion is secured to the base portion such that the forward facing surface of the base portion abuts the similar rear surface of the first base extension segment, and wherein one or more additional base extension segments each include means for securing such additional base extension segment to the preceding segment such that the rear surface of the additional base extension segment is secured to the front surface of the preceding segment, whereby the length of the base portion is extended without changing the profile of the front surface of the seat form.

9. A seat form as defined in claim 8, wherein the back portion has an upward facing surface, wherein a first back extension segment having parallel upper and lower surfaces similar to the upward facing surface of the back portion is secured to the back portion such that the upward facing surface of the back portion abuts the lower surface of the first back extension segment, and wherein one or more additional back extension segments each include means for securing such additional back extension segment to the preceding back extension segment, such that the lower surface of the additional back extension segment is secured to the upper surface of the preceding back extension segment, whereby the length of the back portion of the seat form is extended without changing the profile of the upper surface of the seat form.

10. A seat form as defined in claim 1, wherein the one or more extension segments each have holes therethrough sized to receive segment bolts for securing the one or more extension segments to the base or back portions of the seat form.

11. A seat form comprising:
    a generally vertically-oriented back portion,
    a generally horizontally-oriented base portion secured to the back portion in a manner allowing the relative angle formed between the back and base portions to be varied, and
    one or more extension segments, each of such extension segments including means for rigidly securing it directly to, and abutting, the back portion or the base portion, such that relative movement of the segment and the segment or portion to which it is secured is inhibited, or another extension segment previously secured to the back portion or the base portion, to vertically extend the length of the back portion, in a direction away from the base portion, or horizontally extend the length of the base portion, in a direction perpendicularly away from the back portion.

12. A seat form as defined in claim 11, wherein the back and base portions are interconnected by way of a hinge.

13. A seat form as defined in claim 12, wherein the hinge is a multileaved friction hinge.

14. A seat form as defined in claim 13, wherein there are a plurality of hinges interconnecting the back and base portions.

15. A seat form comprising:
    a generally vertically-oriented back portion,
    a generally horizontally-oriented base portion secured to the back portion, said base portion having a C-shaped channel extending axially along the base portion, a pommel secured to, and extending axially along, the base portion, a Tee-bolt secured to the pommel and having a head sized to fit into the C-shaped channel of the base portion, thus securing the pommel to the base portion, wherein the location of the pommel on the base portion is adjustable by sliding the head of the Tee-bolt along the C-shaped channel of the base portion, and one or more extension segments, each of such extension segments including means for securing it directly to, and abutting, the back portion or the base portion, or another extension segment previously secured to the back portion or the base portion, to vertically extend the length of the back portion, in a direction away from the base portion, or horizontally extend the length of the base portion, in a direction perpendicularly away from the back portion.

16. A seat form as defined in claim 15, wherein:

the pommel includes a plurality of segments and joining webs for connecting the segments together; and the pommel is adjustable in length to suit the base portion by cutting the appropriate joining web and removing the corresponding segments to achieve the desired length.

17. A seat form comprising:

a generally vertically-oriented back portion, a generally horizontally-oriented base portion secured to the back portion, and one or more extension segments, each of such extension segments including means for securing it directly to, and abutting, the back portion or the base portion, or another extension segment previously secured to the back portion or the base portion, to vertically extend the length of the back portion, in a direction away from the base portion, or horizontally extend the length of the base portion, in a direction perpendicularly away from the back portion, wherein the one or more extension segments each have holes therethrough sized to receive segment bolts for securing the one or more extension segments to the base or back portions of the seat form, and wherein the base and back portions have threaded sockets molded therein, such that a first extension segment can be secured to the base and/or back portions by extending segment bolts through the holes of the first extension segment and into the threaded sockets of the base and/or back portions.

18. A seat form as defined in claim 17, wherein the segment bolts each have a head on an upper end and a threaded shaft on a lower end, said head having a bore extending axially therein to receive the threaded shaft of another segment bolt, such that additional extension segments can be secured to preceding extension segments by threading the segment bolts of the additional extension segments into the segment bolts of the preceding extension segment.

19. A seat form as defined in claim 18, wherein the holes through the extension segments have enlarged openings to accommodate the heads of the segment bolts, such that the segment bolts do not protrude from the completed seat form.

20. A mobile chair comprising:

a frame including an inverted Y-shaped backbone member having a substantially narrow upper portion arranged at an upper end to support handle grips for manoeuvering the chair and having a bifurcated lower portion formed from first and second arms, each arm extending downwardly from the upper portion and outwardly with respect to one another, a first rear wheel rotatably secured to a first rear wheel mount carried by the first arm of the lower portion and a second rear wheel rotatably secured to a second rear wheel mount carried by the second arm, the pivot axis of the wheel mounts being spaced substantially below the upper portion of the backbone member and the wheel mounts being spaced apart from each other by substantially more than the maximum width of the backbone member's upper portion, a seat support member extending forwardly from the backbone member, intermediate the backbone member's upper and lower portion, and a front member extending downwardly from the seat support to support the distal end thereof, the front member being arranged to carry a mount at its lower end having at least one front wheel rotatably secured thereto; and a seat form including a generally vertically-oriented back portion, a generally horizontally-oriented base portion secured to the back portion, and one or more extension segments, each of such extension segments including means for securing it directly to and abutting the back portion or the base portion, or to another extension segment previously secured to the back portion or the base portion, to vertically extend the length of the back portion, in a direction away from the base portion, or horizontally extend the length of the base portion, in a direction perpendicularly away from the back portion, wherein the seat form is connected to the seat support member and supported thereon.

21. The combination as defined in claim 20, wherein the seat support member is releasably connected to the lower portion of the backbone member.

22. The combination as defined in claim 20 wherein the backbone member is articulated so that the angle between the upper portion of the backbone member and the seat support member may be varied.

23. The combination as defined in claim 22 wherein:

the articulated joint comprises a double hinge arrangement interconnecting the backbone member's upper and lower portions and forming part of the lower portion; and the upper portion of the backbone member is connected to a first axle of the hinge and a clamp member is connected to a second axle of the hinge, offset from the first axle, whereby the relative angle between the backbone member's upper and lower portions is maintained by securing the clamp member to the upper portion.

24. The combination as defined in claim 23 wherein the upper portion of the backbone member, the seat support member, and the front member are formed from similar aluminum extrusions, each having at least one slot arranged to receive the heads of bolts for securing the clamp member, handle grips, footrests, and seat mounting means, respectively, to the frame.

25. The combination as defined in claim 20, wherein the first and second rear wheel mounts are adjustable to vary the effective height of the lower portion of the backbone member.

26. The combination as defined in claim 25 wherein the first and second rear wheel mounts affect the height variation by rotation of the axle of the rear wheels about an offset axis.

27. The combination as defined in claim 20 wherein:
said seat support member further includes a tongue and said backbone member further includes a slot passing therethrough; and
the seat support member can be releasably attached to the lower portion of the backbone member by placing the tongue of the seat support member through the slot of said backbone member.

28. The combination as defined in claim 27 wherein said backbone member further includes a hand screw placed to extend into the slot, whereby said tongue is further secured in the slot by tightening the hand screw such that it applies a force against the tongue.

29. The combination as defined in claim 20 wherein the upper portion of the backbone member, the seat support member, and the front member are all formed from similar aluminum extrusions, each having at least one slot arranged to receive the heads of bolts for securing associated structures and enabling adjustment thereof.

30. The combination as defined in claim 20 wherein:
the first and second rear wheel mounts each include a substantially U-shaped main body portion forming legs and an arm pivotally attached between the legs of the main body portion, said arm having holes through which the axle of the corresponding wheel is mounted and being adapted to pivot between two positions to adjust the effective height and angle of the lower portions of the backbone member, such that in a first position the wheel axle is in front of the main body pivot axis and in a second position the wheel axis is to the rear of the main body pivot axis;
whereby the weight of the frame causes aid arms to bear against the main body portions regardless of the orientation of the wheels, such that the orientation of the wheels can be changed only by lifting the frame to remove the weight on the rear wheels and then pivoting the wheels from one position to the other.

31. The combination as defined in claim 20 wherein the upper portion of the backbone member, the seat support member, and the front member are all formed from similar aluminum extrusions having a uniform width substantially narrower than the spacing of the first and second rear wheel mounts.

32. The combination as defined in claim 20 wherein the rear wheel mounts are spaced apart from each other by about five times the maximum width of the backbone member's upper portion.

33. The combination as defined in claim 20 wherein the seat form further includes raised sides extending along the opposite side edges of the base portion and any base extension segments.

34. The combination as defined in claim 33, wherein the base portion has a forward facing surface, wherein a first base extension segment having parallel front and rear surfaces similar to the forward facing surface of the base portion is secured to the base portion such that the forward facing surface of the base portion abuts the similar rear surface of the first base extension segment, and wherein one or more additional base extension segments each include means for securing such additional base extension segment to the preceding segment such that the rear surface of the additional base extension segment is secured to the front surface of the preceding segment, whereby the length of the base portion is extended without changing the profile of the front surface of the base portion of the seat form.

35. The combination as defined in claim 34, wherein the back portion has an upward facing surface, wherein a first back extension segment having parallel upper and lower surfaces similar to the upward facing surface of the back portion is secured to the back portion such that the upward facing surface of the back portion abuts the lower surface of the first back extension segment, and wherein one or more additional back extension segments each include means for securing such additional back extension segment to the preceding back extension segment such that the lower surface of the additional back extension segment is secured to the upper surface of the preceding back extension segment, whereby the length of the back portion of the seat form is extended without changing the profile of the upper surface of the seat form.

36. The combination as defined in claim 20 wherein the back portion had base portion are secured together in a manner allowing the relative angle formed between the back and base portions to be varied.

37. The combination as defined in claim 36, wherein the back and base portions are interconnected by way of a hinge.

38. The combination as defined in claim 37, wherein the hinge is a multileaved friction hinge.

39. The combination as defined in claim 38, wherein there are a plurality of hinges interconnecting the back and base portions.

40. The combination as defined in claim 37, wherein the segment bolts each have a head on an upper end and a threaded shaft on a lower end, said head having a bore extending axially therein to receive the threaded shaft of another segment bolt, such that additional extension segments can be secured to preceding extension segments by threading the segment bolts of the additional extension segments into the segment bolts of the preceding extension segment.

41. The combination as defined in claim 40, wherein the holes through the extension segments have enlarged openings to accommodate the heads of the segment bolts, such that the segment bolts do not protrude from the complete seat form.

42. The combination as defined in claim 41, wherein mounting means are provided having a first end adapted to fit in the stepped recess and a second end which is adapted to protrude from the rear surface of the first extension segment, the mounting means being securely located relative to the first back extension segment when the first back extension segment is secured to the back portion or the extension segment previously secured to the back portion.

43. The combination as defined in claim 42 wherein the mounting means is adapted to enable a head rest or restraint means to be secured thereto.

44. The combination as defined in claim 20, and further including a pommel secured to, and extending axially along, the base portion.

45. The combination as defined in claim 44 wherein the seat form further includes a Tee-bolt, the base portion further includes a C-shaped channel ad the location of the pommel on the base portion is adjustable by sliding the head of a Tee-bolt secured to the pommel along a C-shaped channel of the base portion.

46. The combination as defined in claim 45, wherein the pommel includes a plurality of segments and joining webs for connecting the segments together; and said pommel is adjustable in length to suit the base portion by cutting the appropriate joining web and removing said segments to achieve the desired length.

47. The combination as defined in claim 20, wherein the seat form has a mounting plate molded or otherwise secured into the base portion to allow the seat form to be interchangeably mounted to the frame.

48. The combination as defined in claim 20, wherein the base portion has a forward facing surface, wherein a first base extension segment having parallel front and rear surfaces similar to the forward facing surface of the base portion is secured to the base portion such that the forward facing surface of the base portion abuts the similar rear surface of the first base extension segment, and additional base extension segments each include means for securing such additional base extension segment to the preceding segment such that the rear surface of the additional base segment is secured to the front surface of the preceding segment, whereby the length of the base portion is extended without changing the profile of the front surface of the base portion of the seat form.

49. The combination as defined in claim 48, wherein the back portion has an upward facing surface, wherein a first back extension segment having parallel upper and lower surfaces similar to the upward surface of the back portion is secured to the back portion such that the upward facing surface of the back portion abuts the lower surface of the first back extension segment, and wherein one or more additional back extension segments each include means for securing such additional back extension segment to the preceding back extension segment such that the lower surface of the additional back extension segment is secured to the upper surface of the preceding back extension segment, whereby the length of the back portion of the seat form is extended without changing the profile of the upper surface of the seat form.

50. The combination as defined in claim 20, wherein the one or more extension segments each have holes therethrough sized to receive segment bolts for securing the one or more extension segments to the base or back portions of the seat form.

51. The combination as defined in claim 50, wherein the base and back portions have threaded sockets molded therein, such that a first extension segment can be secured to the base or back portions by extending segment bolts through the holes of the first extension segment and into the threaded sockets of the base or back portions.

52. The combination as defined in claim 20, wherein a first back extension segment is provided having upper and lower surfaces interconnected by a forward surface and a rear surface, the first back extension incorporating a stepped recess on its lower surface which extends to the rear surface of the extension segment, the lower surface of first extension segment adapted to be secured directly to and abutting the back portion, or to another extension segment previously secured to the back portion such that when secured thereto a cavity is formed at the stepped recess and which is defined by the lower surface of the first back extension and the upper surface of the preceding extension segment or back portion.

* * * * *